US008587467B1

(12) United States Patent
Zemany

(10) Patent No.: US 8,587,467 B1
(45) Date of Patent: Nov. 19, 2013

(54) METHOD AND APPARATUS FOR DETERMINING LOCATIONS OF A MOVING RADAR

(75) Inventor: Paul D. Zemany, Amherst, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 710 days.

(21) Appl. No.: 12/891,878

(22) Filed: Sep. 28, 2010

(51) Int. Cl.
*G01S 13/42* (2006.01)

(52) U.S. Cl.
USPC ............. 342/13; 342/107; 342/113; 342/139; 342/146; 342/417

(58) Field of Classification Search
USPC ........... 342/13, 107–109, 113, 115, 139–140, 342/146–147, 357.2, 357.22, 357.25, 417, 342/450–451
See application file for complete search history.

(56) References Cited

U.S. PATENT DOCUMENTS

| | | | | |
|---|---|---|---|---|
| 6,163,297 | A * | 12/2000 | Rose | 342/418 |
| 6,933,888 | B1 | 8/2005 | Schiffmiller et al. | |
| 7,315,280 | B2 | 1/2008 | Schiffmiller et al. | |
| 7,474,219 | B2 * | 1/2009 | Richards et al. | 340/572.4 |
| 7,880,608 | B2 * | 2/2011 | Richards et al. | 340/539.1 |
| 8,154,411 | B2 * | 4/2012 | Richards et al. | 340/573.1 |
| 2003/0071733 | A1 * | 4/2003 | Hall et al. | 340/573.1 |
| 2007/0139200 | A1 * | 6/2007 | Yushkov et al. | 340/572.1 |
| 2008/0042845 | A1 * | 2/2008 | Richards et al. | 340/572.4 |
| 2010/0295734 | A1 * | 11/2010 | Wu et al. | 342/463 |
| 2010/0309059 | A1 * | 12/2010 | Wu et al. | 342/463 |
| 2013/0154836 | A1 * | 6/2013 | Derrico et al. | 340/572.1 |

OTHER PUBLICATIONS

Soo-Young Lee; Jong-Tae Park, "NLOS Error Mitigation in a Location Estimation of Object based on RTLS Using Kalman Filter," SICE-ICASE, 2006. International Joint Conference , vol., no., pp. 2942,2946, Oct. 18-21, 2006.*

* cited by examiner

*Primary Examiner* — John B Sotomayor
(74) *Attorney, Agent, or Firm* — Yudell Isidore Ng Russell PLLC

(57) ABSTRACT

A method for determining locations of a moving emitter is disclosed. Initially, a set of emitter pulses is collected when a collector platform moves over a collection baseline. In addition, the time and location of the collection platform are recorded each time an emitter pulse is collected. A set of time-tagged pulse time-of-arrival (TOA) values is then generated by associating a recorded collection time value to each of the collected emitter pulses. Next, a set of time-tagged and position-tagged pulse TOA values is generated by associating a recorded collection location value to each of the time-tagged pulse TOA values. Finally, a set of location values and velocity values of a moving emitter is estimated based on the time-tagged and position-tagged pulse TOA values.

15 Claims, 4 Drawing Sheets

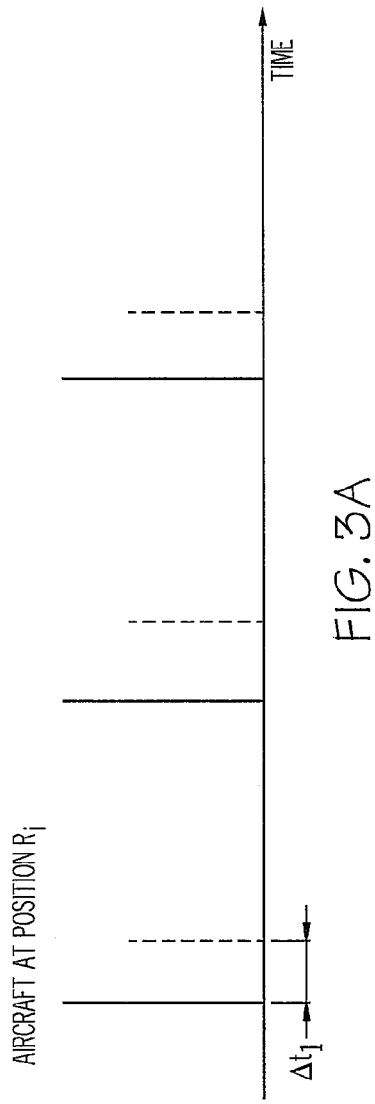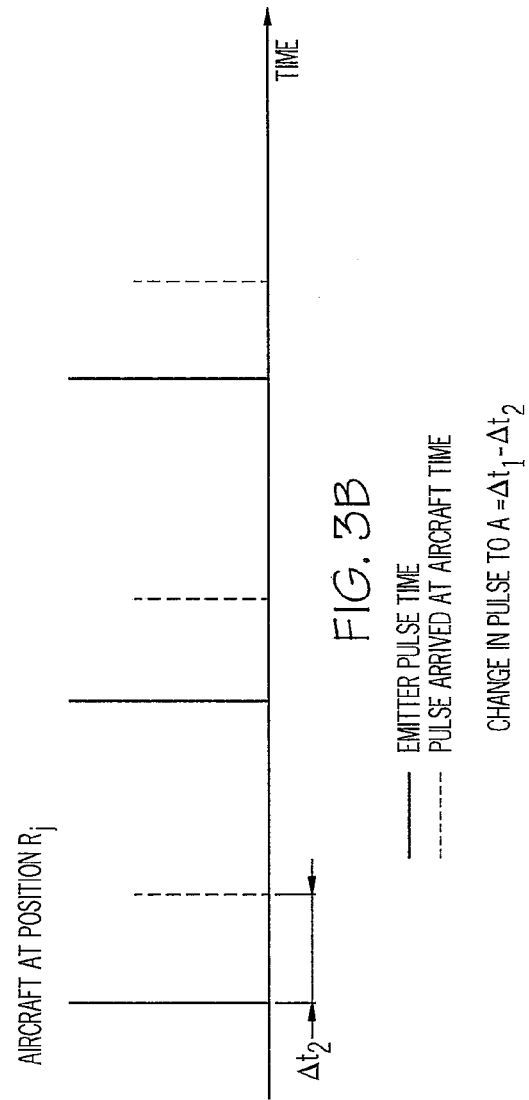

METHOD AND APPARATUS FOR DETERMINING LOCATIONS OF A MOVING RADAR

STATEMENT OF GOVERNMENT INTEREST

The present invention was made with United States Government support under Contract number HR0011-09-C-0096. The Government has certain rights in the present invention.

RELATED PATENT APPLICATIONS

The present patent application is related to U.S. Pat. Nos. 6,933,888 and 7,315,280, the pertinent of which are incorporated by reference herein.

BACKGROUND OF THE INVENTION

1. Technical Field

The present invention relates to geolocation systems in general, and in particular to a method and apparatus for rapidly determining locations of a moving radar.

2. Description of Related Art

It is tactically important for a military aircraft or other platform to be able to detect pulsed radiation from a pulsed emitter such as a radar or other radio frequency source, and to determine the position of the pulsed emitter. Generally, there are two conventional time-based methods for geolocating a pulsed emitter. The first method determines the time differences of arrival (TDOA) of emitter pulses by measuring across two antennae on either a single aircraft or two different aircraft. The second method measures the time-of-arrival (TOA) of emitter pulses as a single aircraft traverses a path. TOA measurements are collected over a number of snippets called dwells. The second method exploits the varying inter-pulse intervals due to movement of the single aircraft from one position to another.

In order for the above-mentioned methods to work, the target emitter is assumed to be stationary. If the target emitter is moving, the above-mentioned methods produce a biased estimate of the target emitter location. Such bias is significant when compared to the distance that the target emitter moves during the observation interval, and in many cases, the bias is also much larger than the effects of the measurement noise.

Consequently, it would be desirable to provide an improved method and apparatus for determining locations of a moving emitter.

SUMMARY OF THE INVENTION

In accordance with a preferred embodiment of the present invention, a set of emitter pulses is collected when a collector platform moves over a collection baseline. In addition, the time and location of the collection platform are recorded each time an emitter pulse is collected. A set of time-tagged pulse time-of-arrival (TOA) values is then generated by associating a recorded collection time value to each of the collected emitter pulses. Next, a set of time-tagged and position-tagged pulse TOA values is generated by associating a recorded collection location value to each of the time-tagged pulse TOA values. Finally, a set of location values and velocity values of a moving emitter is estimated based on the time-tagged and position-tagged pulse TOA values.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein:

FIGS. 3a-3b illustrate a sequence of pulses emitted from a radar; and

DETAILED DESCRIPTION OF A PREFERRED EMBODIMENT

Figure 1:
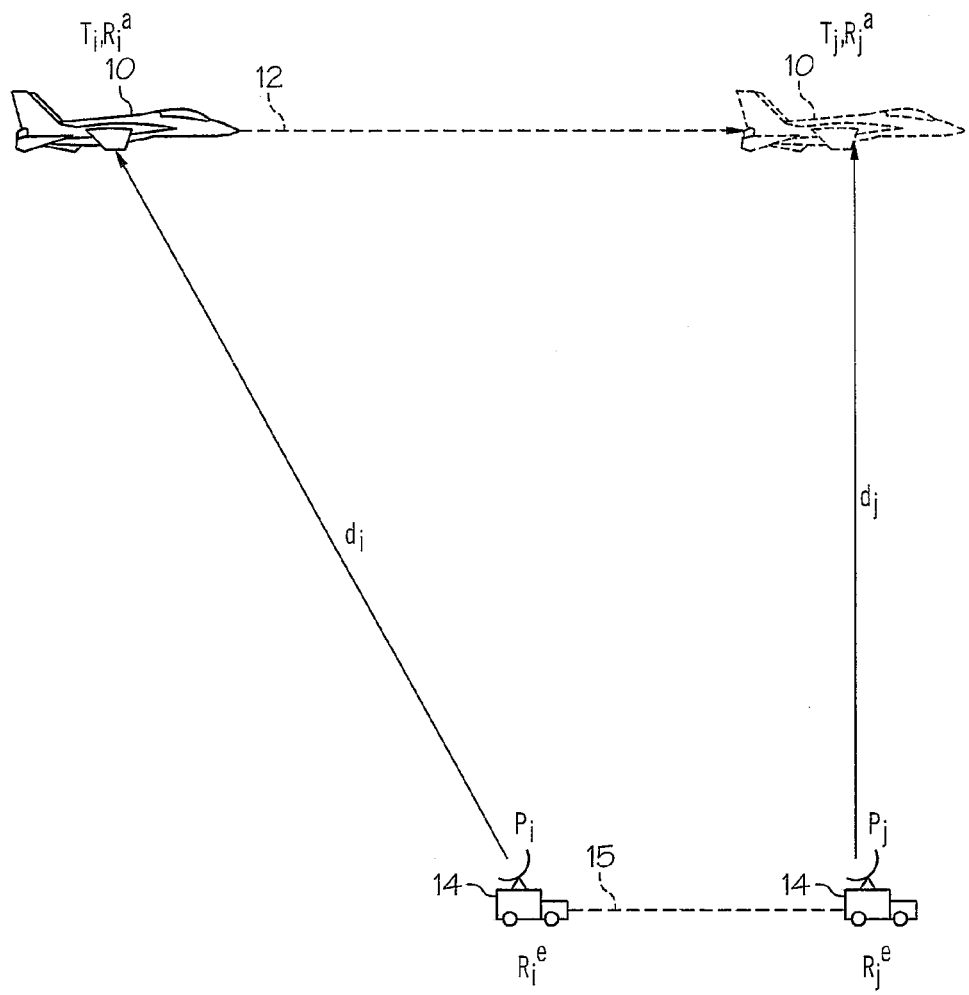
FIG. 1 depicts an environment in which a preferred embodiment of the present invention is applicable.

Referring now to the drawings and in particular to FIG. 1, there is depicted an environment in which a preferred embodiment of the present invention is applicable. As shown, an aircraft 10 traverses a collection baseline 12 from a location $R_i^a$ to a location $R_j^a$. As aircraft 10 traverses along collection baseline 12, it measures the time-of-arrival $T_i \ldots T_j$ of radar pulses at several corresponding aircraft locations $R_i^a \ldots R_j^a$ over collection baseline 12. The resulting time/position pairs (such as $T_i, R_i^a$) represent the time-of-arrival of radar pulses from an emitter 14 to be tracked.

FIG. 1 shows a pulse P, generated by emitter 14 when emitter 14 was at location $R_i^e$, and pulse $P_i$ was detected by aircraft 10 when aircraft 10 was at location $R_i^a$. FIG. 1 also shows a different pulse $P_j$ generated by emitter 14 when emitter 14 was at location $R_j^e$, and pulse $P_j$ was detected by aircraft 10 when aircraft 10 was at location $R_j^a$. Other pulses generated by emitter 14 are detected by aircraft 10 as emitter 14 moves along a path 15 while aircraft 10 moves along collection baseline 12.

Initially, the locations $R_i^e$ and $R_j^e$ of emitter 14 are unknown, and the times that pulses $P_i$ and $P_j$ generated by emitter 14 are also unknown. Aircraft 10 contains a geolocation system for measuring emitter 14's pulse time-of-arrival (TOA) values, and for measuring the locations of aircraft 10 when each of the pulse TOA value was collected.

Figure 2:
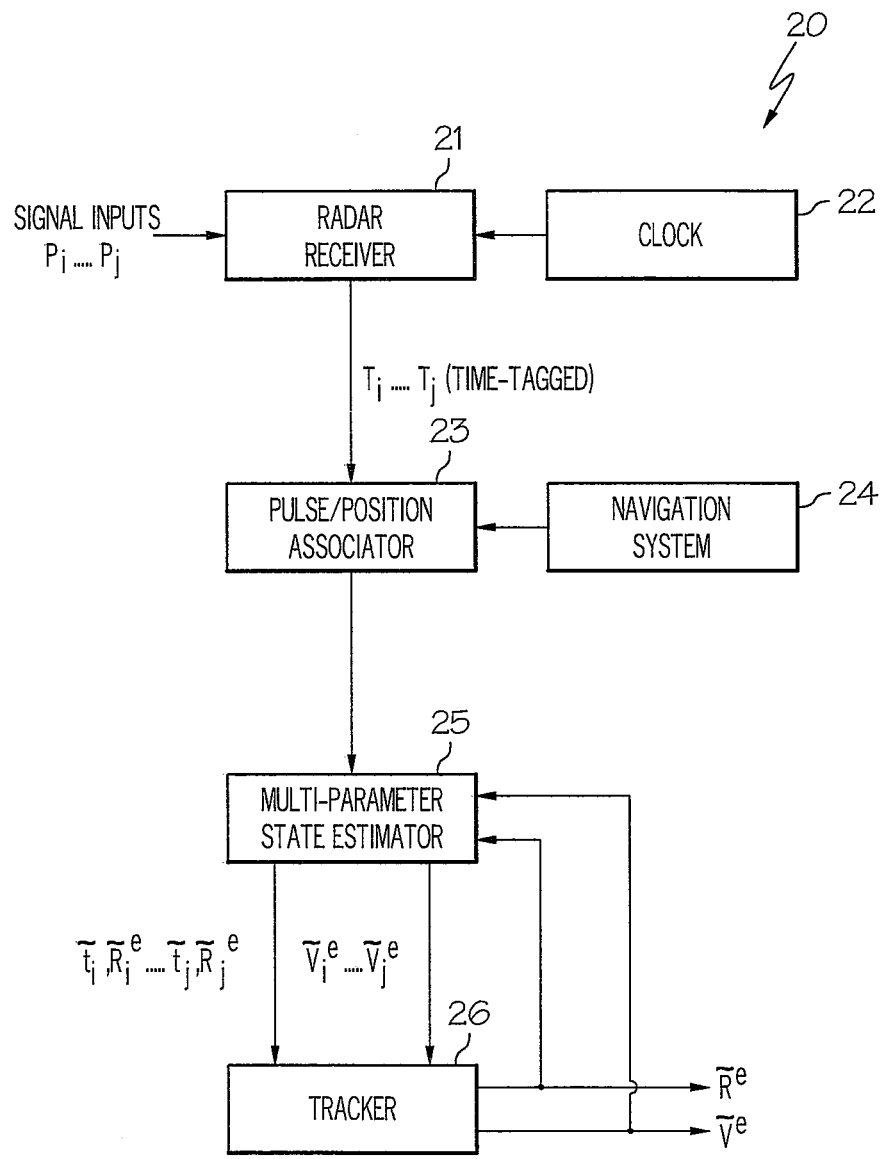
FIG. 2 illustrates a geolocation system in which a preferred embodiment of the present invention is incorporated.

With reference now to FIG. 2, there is depicted a geolocation system in which a preferred embodiment of the present invention is incorporated. Geolocation system 20 is capable of collecting pulse information from emitter 14 (from FIG. 1), and generating estimates of the location and velocity of emitter 14 based on the collected pulse information. As shown, a geolocation system 20 includes a radar receiver 21, a precision clock 22, a pulse/position associator 23, an aircraft navigation system 24, a multi-parameter state estimator 25 and a tracker 26. Radar receiver 21 is directly associated with precision clock 22, and the start time of precision clock 22 is arbitrary. When a pulse is detected by radar receiver 21, the clock time is utilized to define the pulse TOA with a high precision. For example, when each of pulses $P_i \ldots P_j$ is being detected, radar receiver 21 generates one of corresponding pulse TOA values $T_i \ldots T_j$. Pulses $P_i \ldots P_j$ are then associated with corresponding pulse TOA values $T_i \ldots T_j$ to form a set of time-tagged pulse TOA values.

The set of time-tagged pulse TOA values is then fed into pulse/position associator 23 that is connected to navigation system 24. Within pulse/position associator 23, each of time-tagged pulse TOA values is associated with an estimate of the location of aircraft 10 at the time the pulse arrived. Pulse/position associator 23 subsequently generates a set of time-tagged and position-tagged pulse TOA values $T_i,R_i^a \ldots T_j,R_j^a$. The set of time-tagged and position-tagged pulse TOA values $T_i,R_i^a \ldots T_j,R_j^a$ is then fed to multi-parameter state estimator 25.

The set of time-tagged and position-tagged pulse TOA values is preferably built up on a pulse-by-pulse basis. With the addition of a new pulse, the set of time-tagged and position-tagged pulse TOA values can be used by multi-parameter state estimator 25 to provide a set of time/location estimates and a set of velocity estimates of emitter 14. The accuracy of the two sets of estimates improves as more pulses are added. The time/location estimates and the velocity estimates from multi-parameter state estimator 25 are then sent to tracker 26 to provide a current position estimate and a velocity estimate of emitter 14.

Multi-parameter state estimator 25 performs a multi-parameter search to jointly estimate the timing of emitter 14's pulse generator as well as the position and velocity of emitter 14. Parameters representing emitter 14's pulse generator may include, but not limited to, a pulse repetition interval, a pulse stagger pattern, timing phase, and start time. These information allow the emission times of emitter 14's pulses to be predicted. However, since the distances $d_i$ and $d_j$ (from FIG. 1) to emitter 14 and the velocity of emitter 14 are initially unknown, the details of emitter 14's pulse timing cannot be estimated by TOA information alone. The multi-parameter search postulates an initial position and velocity for emitter 14 and an initial timing pattern and phase. With this initial starting point, the measured pulse TOA information are matched to a "model." The quality of the match is measured by a chisq ($\chi^2$) value or a maximum likelihood ratio. The parameters include details of the timing of emitter 14, and the location and velocity of emitter 14 are adjusted so that the chisq value is minimized or the likelihood ratio is maximized.

Emitter 14 generates a sequence of pulses in a specific timing pattern. This timing sequence may be in a constant pulse interval, a staggered pattern, or a complex pattern. FIGS. 3A and 3B show a staggered pattern. FIG. 3A shows pulses emitted as a function of time where time advances towards the left of the diagram. The TOAs of these pulses observed from location $R_i$ at a distance $d_i$ are delayed relative to the emitted time by $d_i/c$, where c is the speed of light, as shown in FIG. 3B. Similarly, at location $R_j$, the delay is a different value $d_j/c$, where c is the speed of light.

During a collection scenario, both aircraft 10 and emitter 14 are in motion. FIG. 1 shows a pulse $P_i$ being emitted by emitter 14 at time $t_i$, and pulse $P_i$ is received by aircraft 10 at $TOA_i = t_i + d_i/c$. FIG. 1 also shows a pulse $P_j$ being emitted at time $t_j$, and pulse $P_j$ is received by aircraft 10 at $TOA_j = t_j + d_j/c$. Note that distance $d_i$ and distance $d_j$ are initially unknown. However, if the radar timing pattern is known, it is possible to compute the change in the aircraft-to-radar distance because $t_i - t_j$ is known since the timing pattern is known:

$$d_i - d_j = c(TOA_i - t_i - TOA_j + t_j)$$

In fact, the range change relative to some starting point over collection path 12 can be found, which, of course, requires keeping track or accounting for all the pulses from emitter 14. Not all emitter pulses need to be detected if the missed emitter pulses are accounted for. Well-known methods such as gradient decent can be utilized to search the parameter space.

The range change is a function of the known location of aircraft 10 (i.e., collection baseline 12) and the unknown and changing locations of emitter 14. An initial guess can be made at the starting location of emitter 14 with the assumption of a certain speed and heading. This allows a predicted range change ($R_i - R_j$) for (j=i, i+1, i+2, ..., i+N) to be made. This prediction is compared to the measured result, and the fit quality (or goodness of fit) is computed. Adjustments to the fit are made to improve the fit quality. Well-known methods such as chisq test or maximum likelihood can be utilized to evaluate the fit quality.

In many cases, the timing pattern of emitter 14 is also unknown. However, by observing the TOA values, it is possible to determine the timing pattern of emitter 14. The observation is done when both aircraft 10 and emitter 14 are moving. This complicates the estimation process since the range changes over the observation window. To address this effect, a multi-parameter search that considers the timing pattern, radar location, and radar velocity vector needs to be performed. Just as before, all parameters are adjusted in order to maximize fit quality.

Figure 4:
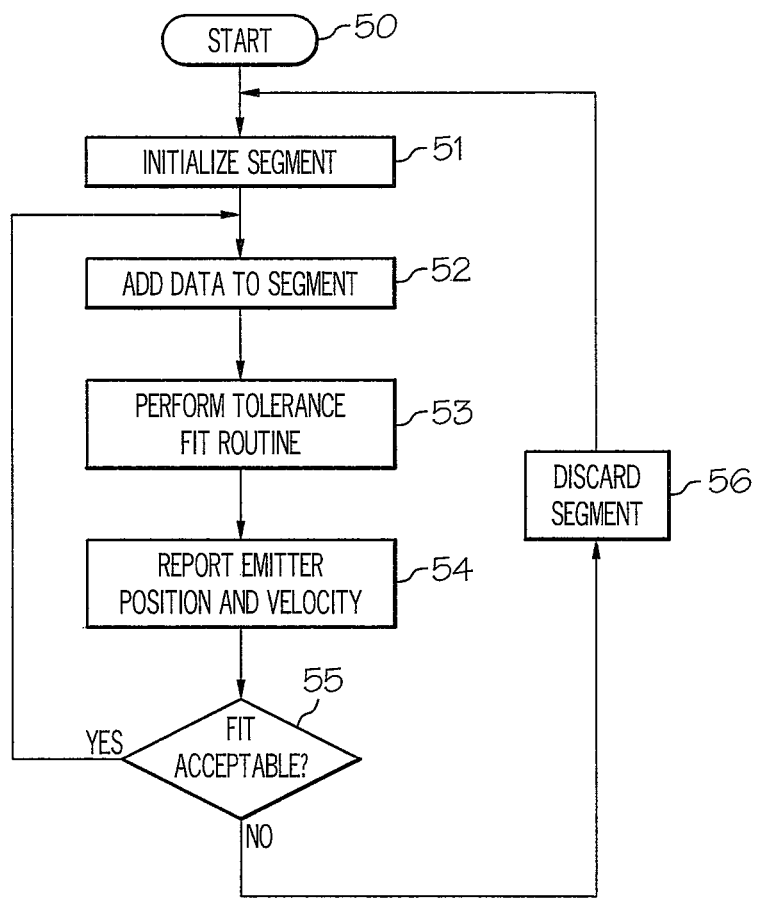
FIG. 4 is a flowchart of a method for determining locations of a moving radar, in accordance with a preferred embodiment of the present invention.

With reference now to FIG. 4, there is depicted a high-level logic flow diagram of a method for rapidly determining locations of a moving radar, in accordance with a preferred embodiment of the present invention. This method is preferably performed by multi-parameter state estimator 25 from FIG. 2. Starting at block 50, a segment is initialized (or reset), as shown in block 51. A segment is designed to include multiple time-tagged and position-tagged pulse TOA values (such as $T_i,R_i^a \ldots T_j,R_j^a$ from FIG. 2) associated with pulses emitted from a specific emitter. New collected pulse information are then added to the segment, as depicted in block 52. A tolerance fit routine is performed on the segment, as shown in block 53. Preferably, the tolerance fit routine includes a chisq fit and residue fit.

At this point, a set of time/location estimates and a set of velocity estimates are calculated, and such estimates are fed into a tracker (such as tracker 26 from FIG. 2) to report an estimate current emitter position and velocity, as depicted in block 54.

A determination is then made whether or not the result of the tolerance fit routine is acceptable, as shown in block 55. If the result of the tolerance fit routine is acceptable, then the process returns to block 52 for adding more collected pulse information to the same segment. Otherwise, if the result of the tolerance fit routine is not acceptable, then the segment is discarded, as depicted in block 56, and the process returns to block 51 to initialize a new segment for receiving collected pulse information.

If the segment is discarded in block 56, the last known position and velocity of the emitter from block 54 are utilized to form an initial starting point in block 51. Thus, the output of tracker 26 (from FIG. 2) is fed to multi-parameter state estimator 25 (from FIG. 2), and this information together with the new segment data from pulse/position associator 23 (from FIG. 2) is used by multi-parameter state estimator 25 to produce updated emitter location and velocity estimates. Feeding the outputs from tracker 26 to multi-parameter state estimator 25 results in a faster convergence in the search process as well as convervence with less pulse data.

In addition, segment sizes can be adjusted to achieve better results for various types of emitters. For example, smaller segment sizes can be used for less predictable emitters.

As has been described, the present invention provides a method and apparatus for rapidly determining locations of a moving radar.

It is also important to note that although the present invention has been described in the context of a fully functional computer system, those skilled in the art will appreciate that the mechanisms of the present invention are capable of being distributed as a program product in a variety of computer recordable type media such as compact discs and digital versatile discs.

While the invention has been particularly shown and described with reference to a preferred embodiment, it will be understood by those skilled in the art that various changes in form and detail may be made therein without departing from the spirit and scope of the invention.

What is claimed is:

1. A method for determining locations of a moving radar, said method comprising:
   collecting a set of radar pulses over a collection baseline;
   recording the time and location of a collection platform each time one of said radar pulses is collected;
   generating a set of time-tagged pulse time-of-arrival (TOA) values by associating a recorded collection time value to each of said collected radar pulses;
   generating a set of time-tagged and position-tagged pulse TOA values by associating a recorded collection location value to each of said time-tagged pulse TOA values; and
   providing a set of estimate location values and velocity values of said moving radar based on said time-tagged and position-tagged pulse TOA values.

2. The method of claim 1, wherein said method further includes providing an estimate location value and velocity value of said moving radar based on said set of estimate location values and velocity values.

3. The method of claim 1, wherein said providing further includes
   adding said time-tagged and position-tagged pulse TOA values to a segment;
   performing a tolerance fit routine on said segment;
   determining whether or not the result of said tolerance fit routine is acceptable;
   in a determination that said tolerance fit result is acceptable, continuing to add new time-tagged and position-tagged pulse TOA values to said segment; and
   in a determination that said tolerance fit result is not acceptable, discarding said segment.

4. The method of claim 3, wherein said tolerance fit routine is a chisq fit routine.

5. The method of claim 1, wherein said collection platform is an aircraft.

6. A computer recordable medium having a computer program product for determining locations of a moving radar, said computer recordable medium comprising:
   program code for collecting a set of radar pulses over a collection baseline;
   program code for recording the time and location of a collection platform each time one of said radar pulses is collected;
   program code for generating a set of time-tagged pulse time-of-arrival (TOA) values by associating a recorded collection time value to each of said collected radar pulses;
   program code for generating a set of time-tagged and position-tagged pulse TOA values by associating a recorded collection location value to each of said time-tagged pulse TOA values; and
   program code for providing a set of estimate location values and velocity values of said moving radar based on said time-tagged and position-tagged pulse TOA values.

7. The computer recordable medium of claim 6, wherein said computer recordable medium further includes program code for providing an estimate location value and velocity value of said moving radar based on said set of estimate location values and velocity values.

8. The computer recordable medium of claim 6, wherein said program code for providing further includes
   program code for adding said time-tagged and position-tagged pulse TOA values to a segment;
   program code for performing a tolerance fit routine on said segment;
   program code for determining whether or not the result of said tolerance fit routine is acceptable;
   program code for, in a determination that said tolerance fit result is acceptable, continuing to add new time-tagged and position-tagged pulse TOA values to said segment; and
   program code for, in a determination that said tolerance fit result is not acceptable, discarding said segment.

9. The computer recordable medium of claim 3, wherein said tolerance fit routine is a chisq fit routine.

10. The computer recordable medium of claim 6, wherein said collection platform is an aircraft.

11. A geolocation system for determining locations of a moving radar, said geolocation system comprising:
    a radar receiver for collecting a set of radar pulses over a collection baseline;
    a clock for recording the time of a collection platform each time one of said radar pulses is collected;
    a navigation system for recording the location of said collection platform each time one of said radar pulses is collected;
    a first associator for generating a set of time-tagged pulse time-of-arrival (TOA) values by associating a recorded collection time value to each of said collected radar pulses;
    a second associator for generating a set of time-tagged and position-tagged pulse TOA values by associating a recorded collection location value to each of said time-tagged pulse TOA values; and
    a multi-parameter state estimator for providing a set of estimate location values and velocity values of said moving radar based on said time-tagged and position-tagged pulse TOA values.

12. The geolocation system of claim 11, wherein said geolocation system further includes a tracker for providing an estimate location value and velocity value of said moving radar based on said set of estimate location values and velocity values.

13. The geolocation system of claim 11, wherein said multi-parameter state estimator further includes
    adding said time-tagged and position-tagged pulse TOA values to a segment;
    performing a tolerance fit routine on said segment;
    determining whether or not the result of said tolerance fit routine is acceptable;
    in a determination that said tolerance fit result is acceptable, continuing to add new time-tagged and position-tagged pulse TOA values to said segment; and
    in a determination that said tolerance fit result is not acceptable, discarding said segment.

14. The geolocation system of claim 13, wherein said tolerance fit routine is a chisq fit routine.

15. The geolocation system of claim 11, wherein said collection platform is an aircraft.

* * * * *